US010928603B2

(12) United States Patent
Roa-Quispe et al.

(10) Patent No.: US 10,928,603 B2
(45) Date of Patent: Feb. 23, 2021

(54) PATCH PANEL SYSTEM WITH TILTABLE TRAY AND MULTIPOSITION LOCK AND RELEASE MECHANISM

(71) Applicant: BELDEN CANADA ULC, Saint-Laurent (CA)

(72) Inventors: Christian Roa-Quispe, Laval (CA); Marc Fontaine, Les Cèdres (CA)

(73) Assignee: BELDEN CANADA ULC

( * ) Notice: Subject to any disclaimer, the term of this patent is extended or adjusted under 35 U.S.C. 154(b) by 0 days.

(21) Appl. No.: 16/561,731

(22) Filed: Sep. 5, 2019

(65) Prior Publication Data

US 2020/0081214 A1  Mar. 12, 2020

Related U.S. Application Data

(60) Provisional application No. 62/727,736, filed on Sep. 6, 2018.

(51) Int. Cl.
*G02B 6/44* (2006.01)
(52) U.S. Cl.
CPC .................................. *G02B 6/4453* (2013.01)
(58) Field of Classification Search
CPC .......................................... G02B 6/4453–4455
See application file for complete search history.

(56) References Cited

U.S. PATENT DOCUMENTS

| | | | | |
|---|---|---|---|---|
| 7,409,137 B2 * | 8/2008 | Barnes | ............... | G02B 6/4455 312/331 |
| 8,280,216 B2 * | 10/2012 | Cooke | ................. | G02B 6/4455 385/135 |
| 8,385,710 B2 * | 2/2013 | Wong | .................. | G02B 6/4455 385/135 |
| 9,128,262 B2 * | 9/2015 | Campbell | ............ | G02B 6/4455 |
| 10,359,595 B2 * | 7/2019 | Aramayo | ............. | G02B 6/4455 |
| 10,598,884 B2 * | 3/2020 | Fontaine | .............. | G02B 6/4455 |
| 10,768,387 B2 * | 9/2020 | Pilon | .................... | G02B 6/4455 |
| 10,795,107 B2 * | 10/2020 | Pilon | ........................ | G02B 6/46 |
| 2008/0085093 A1 * | 4/2008 | Krampotich | ......... | G02B 6/4455 385/135 |
| 2018/0259736 A1 * | 9/2018 | Hsu | ....................... | G02B 6/4455 |
| 2020/0081214 A1 * | 3/2020 | Roa-Quispe | ......... | G02B 6/4453 |

* cited by examiner

*Primary Examiner* — Rhonda S Peace
(74) *Attorney, Agent, or Firm* — Lavery, De Billy, LLP; Hugh Mansfield

(57) ABSTRACT

A patch panel system is disclosed comprising a plurality of trays wherein each tray is stored within a patch panel housing but moveable towards the front of the housing into one of a patch position or an extended position. The tray is lockable in either the patch position or the extended position. In the extended position a front tray section holding one or more fiber optic connectors or modules is tiltable versus a rear tray section. In particular embodiment the tray can also be moved from the stored position into a retracted position behind the housing. A release mechanism comprising a lock is also provided which can be actuated to release the lock thereby allowing the tray to be slid out of the patch position and the extended position.

15 Claims, 21 Drawing Sheets

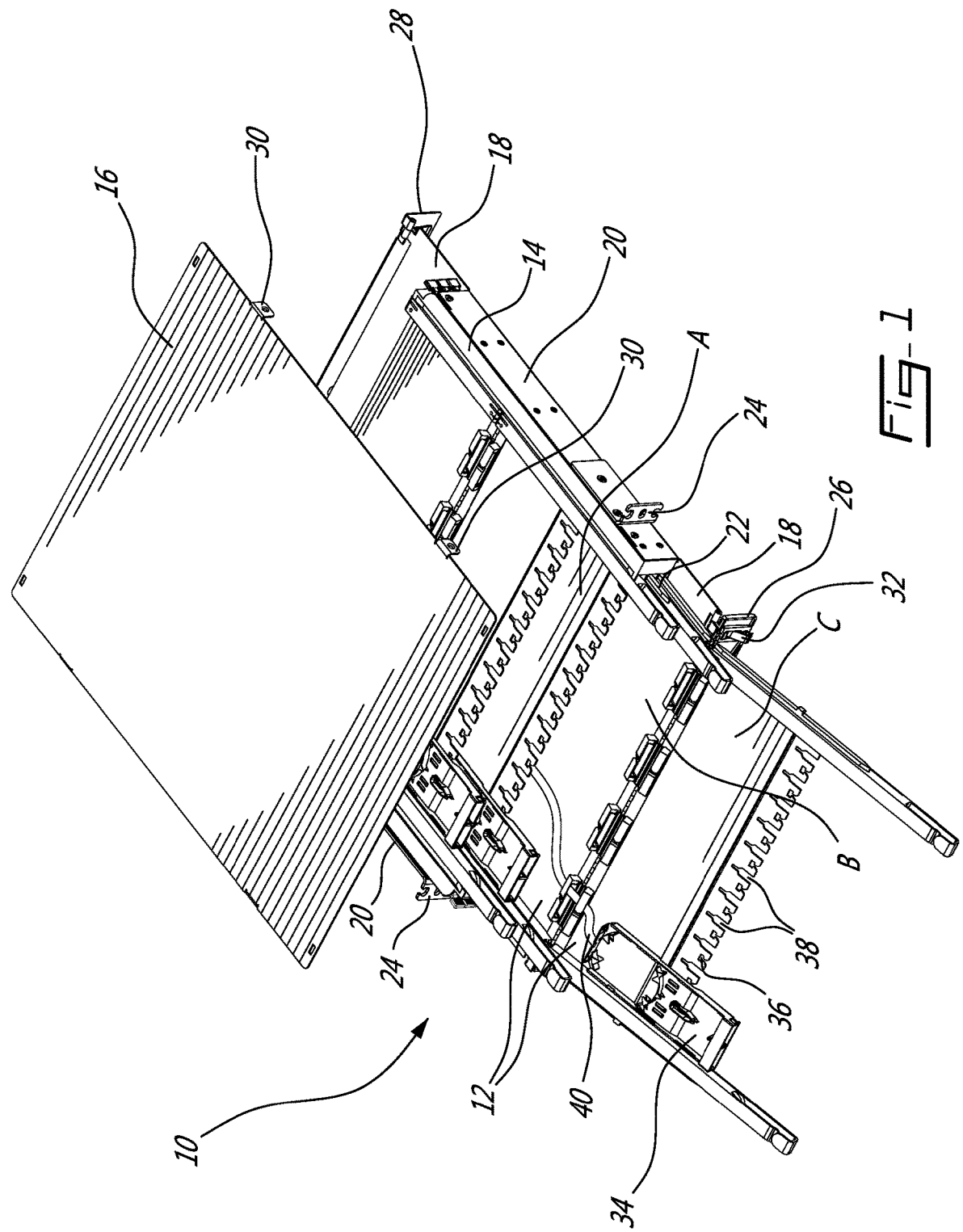

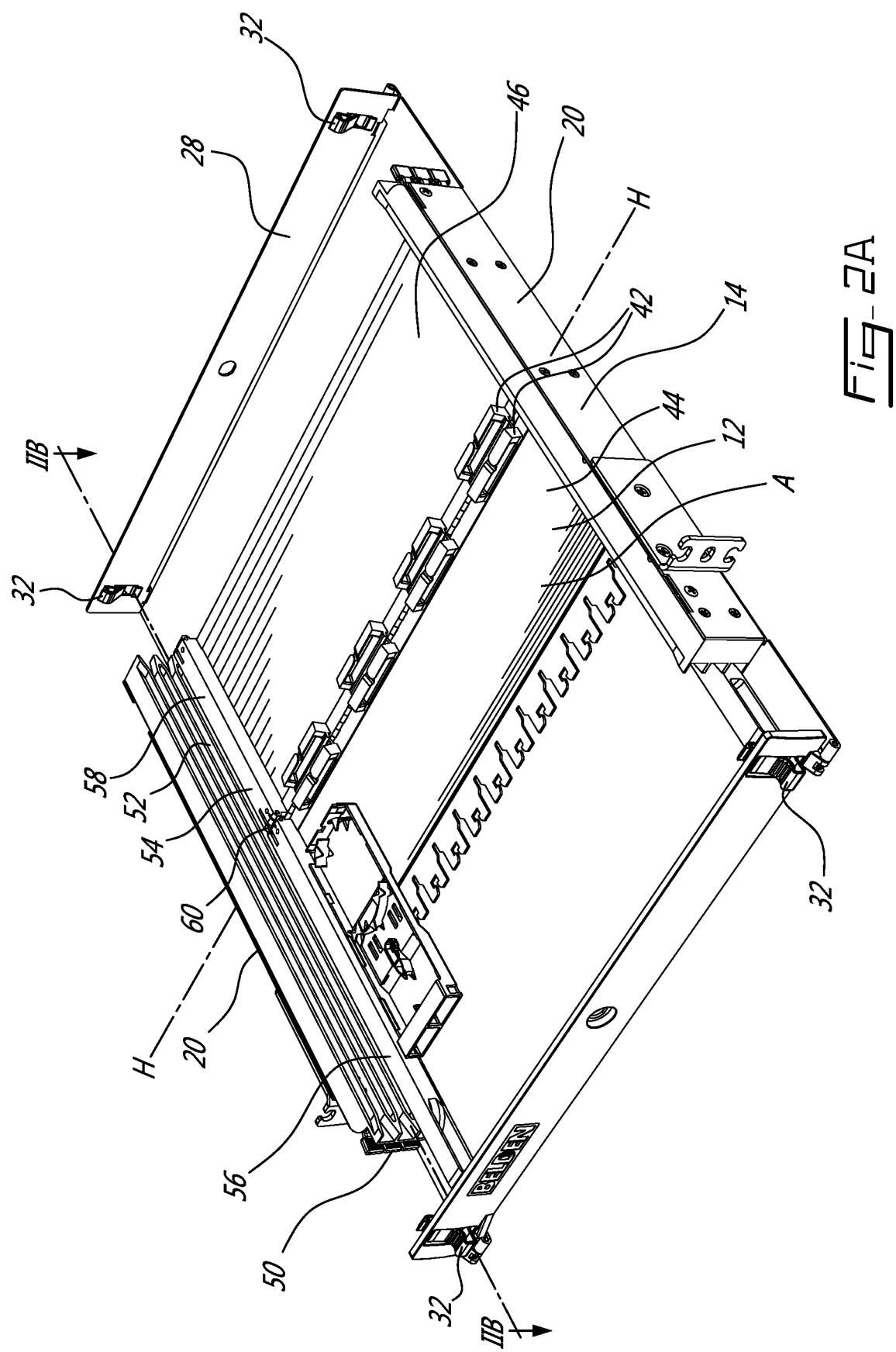

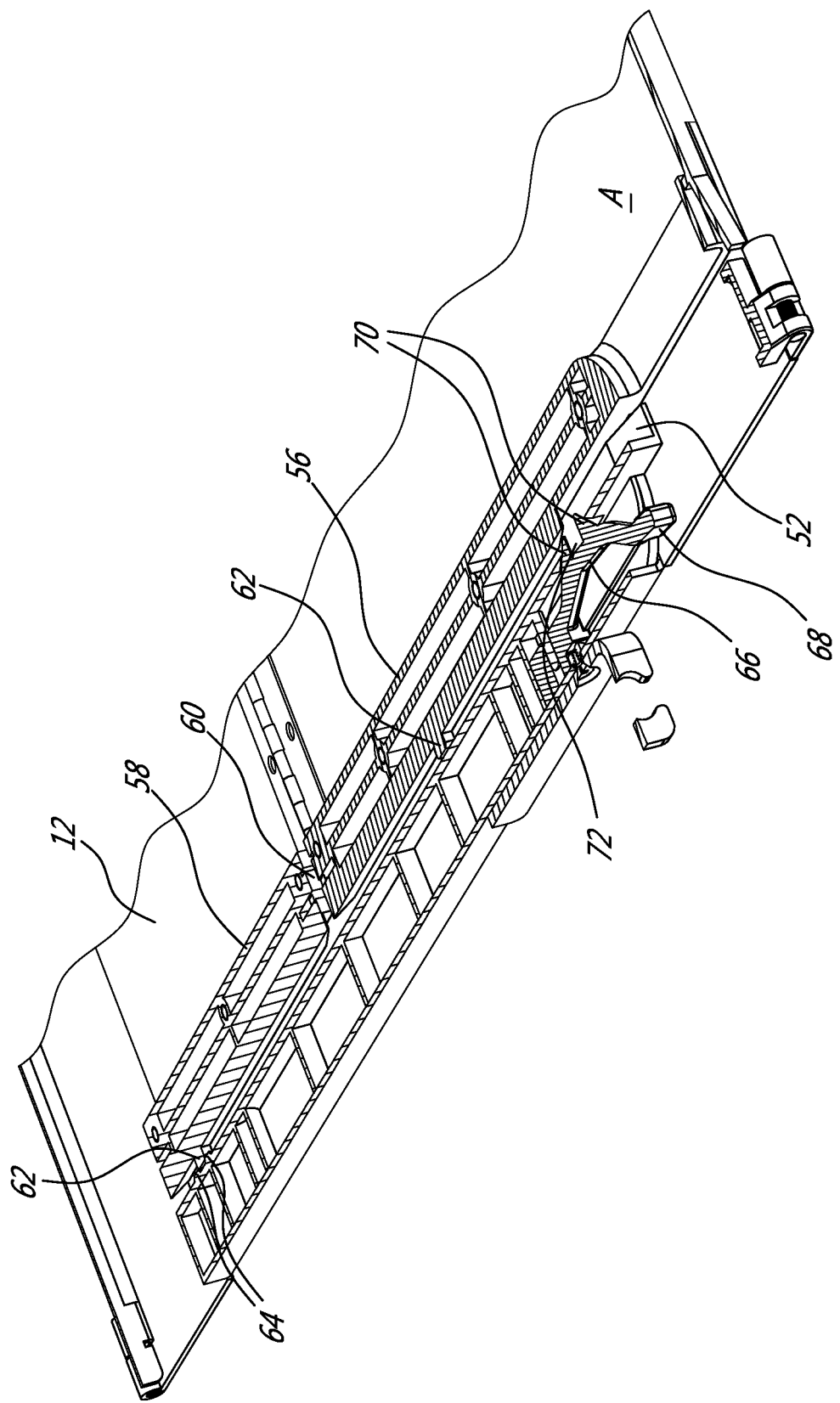

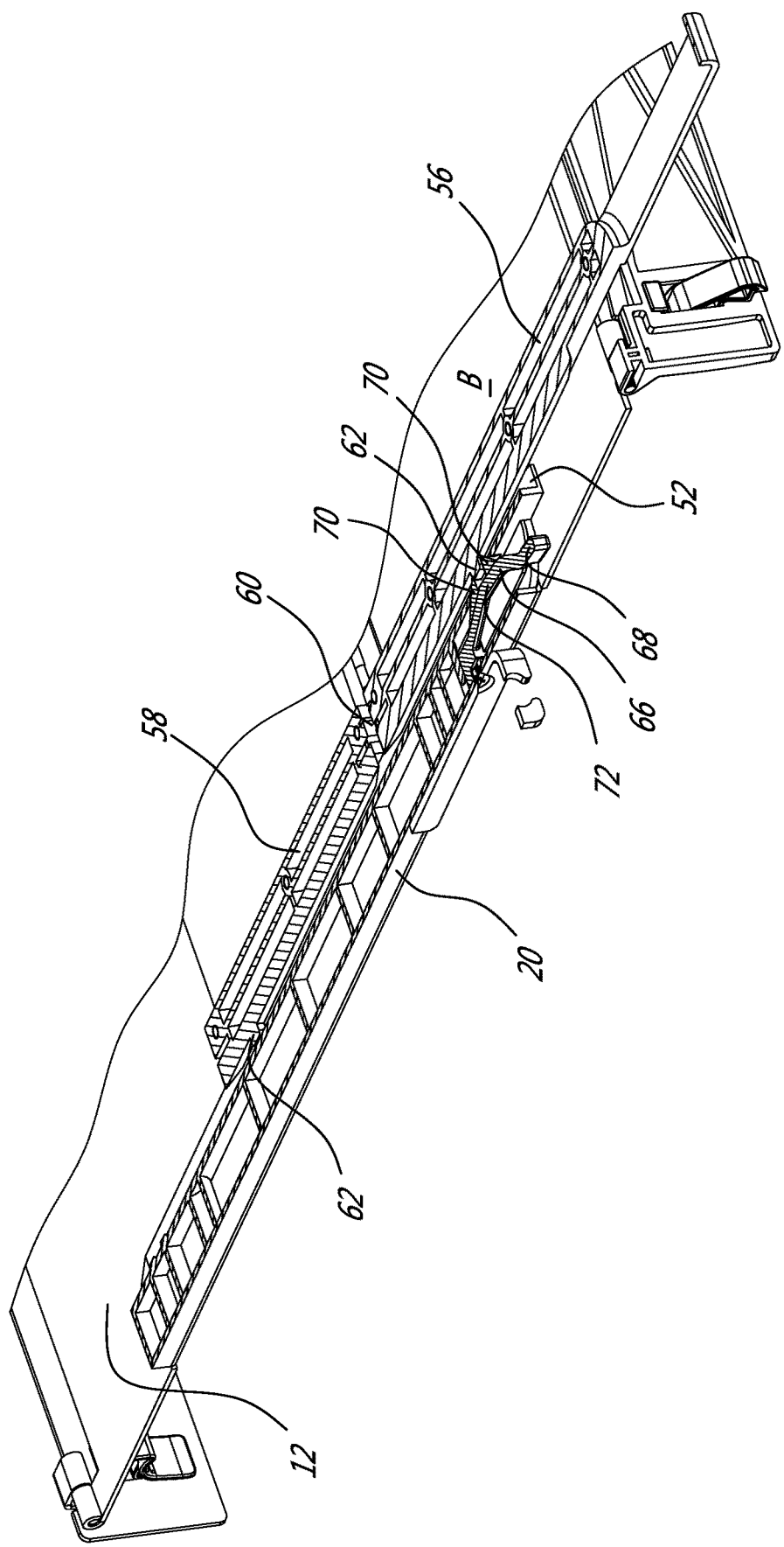

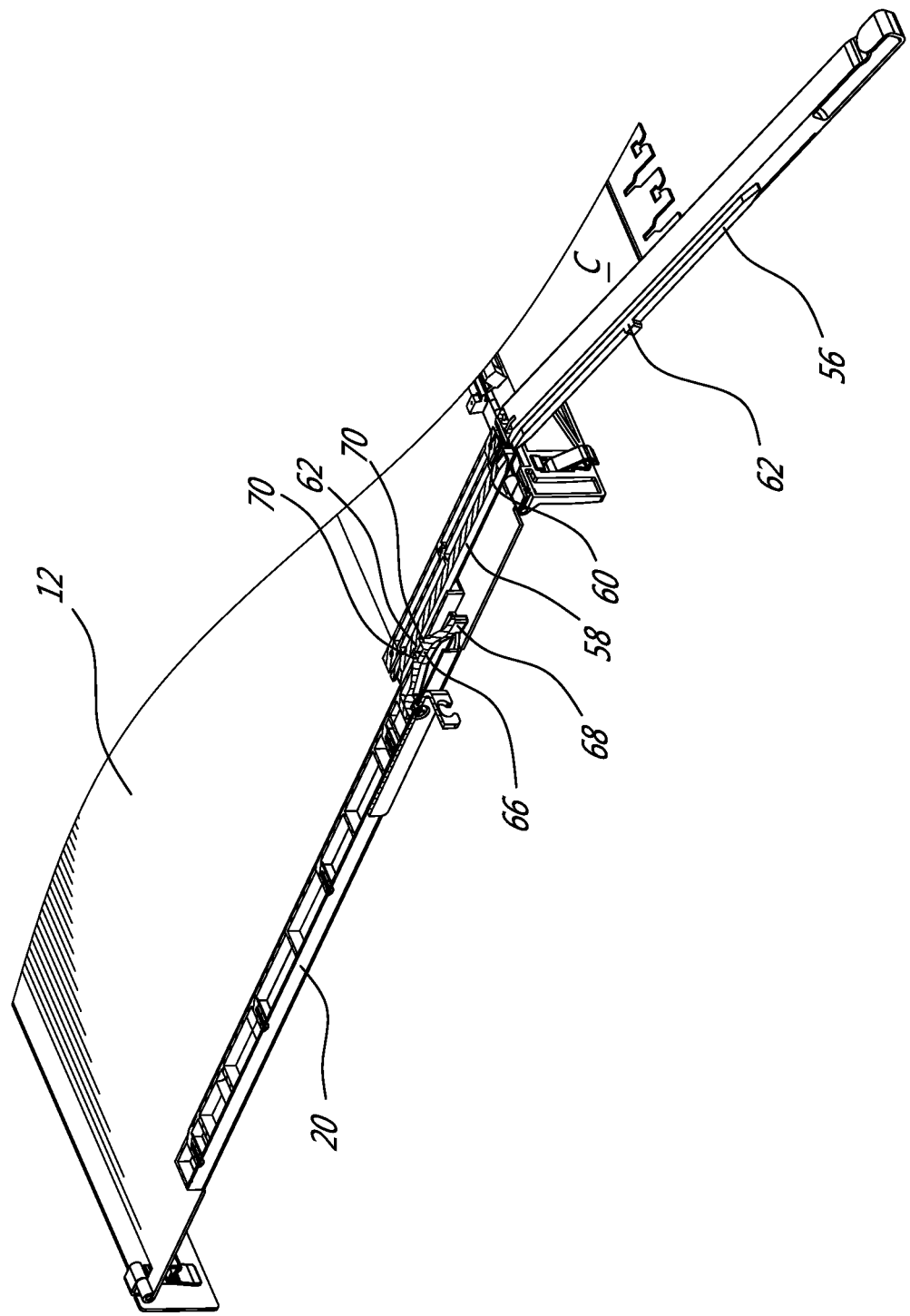

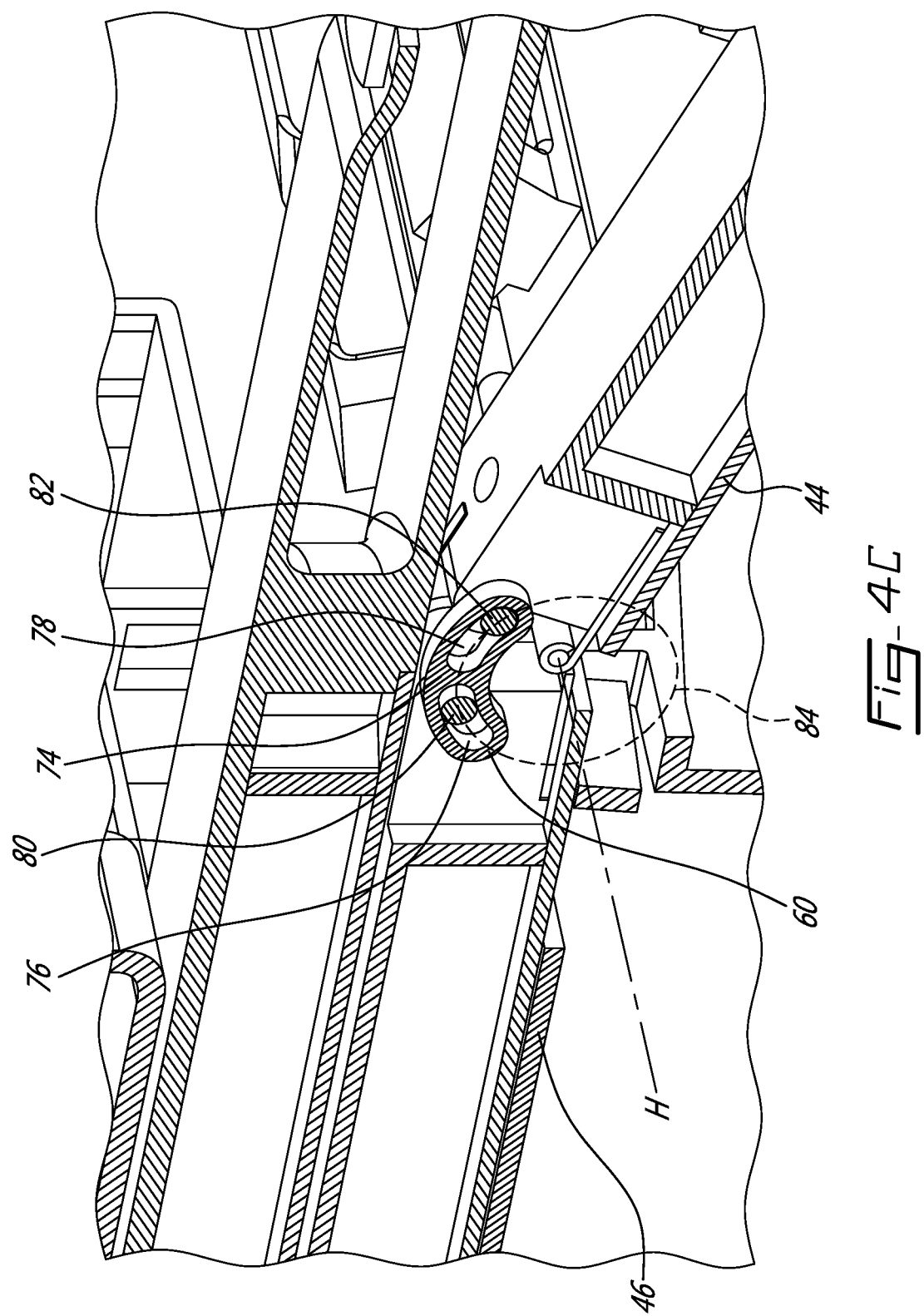

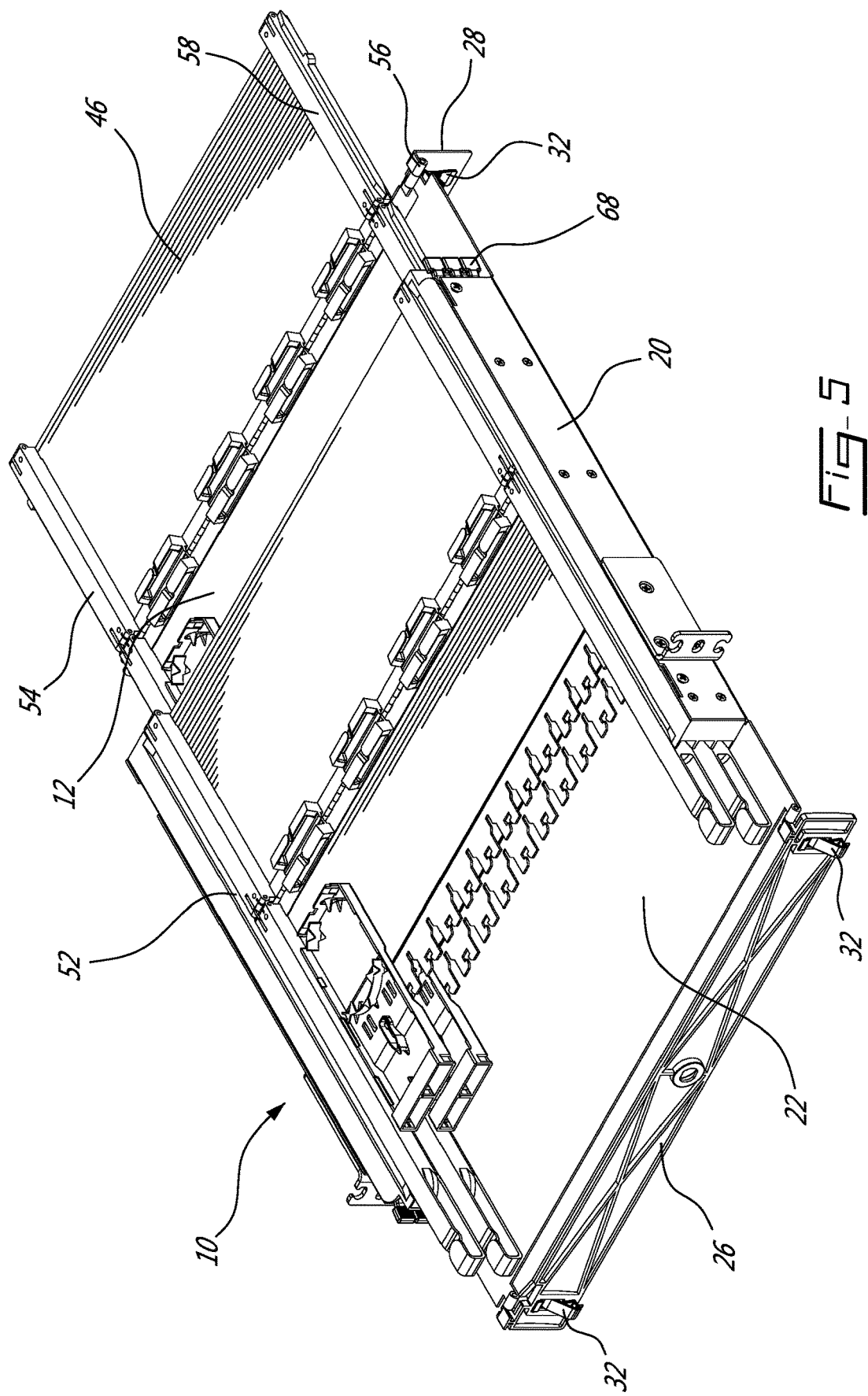

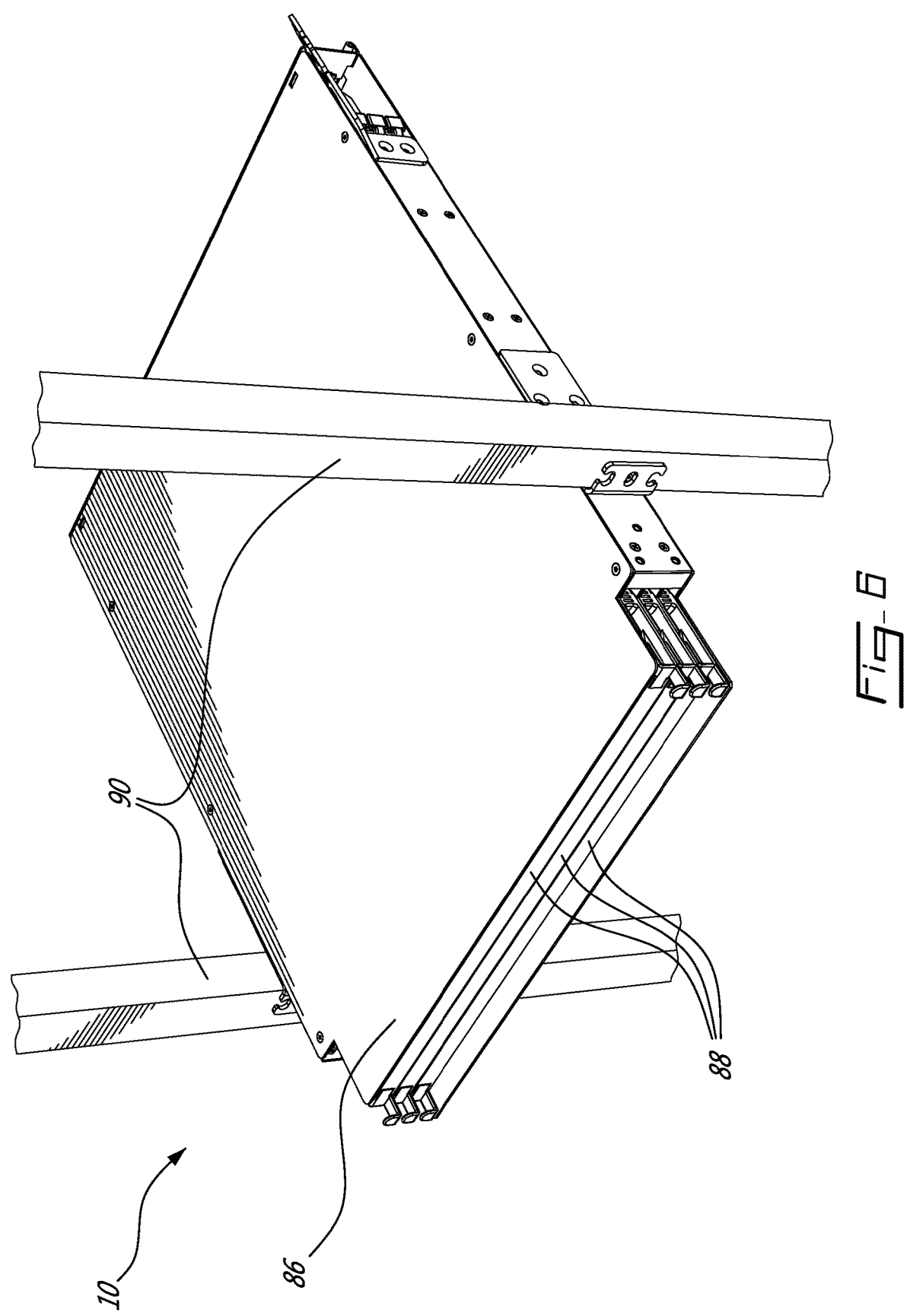

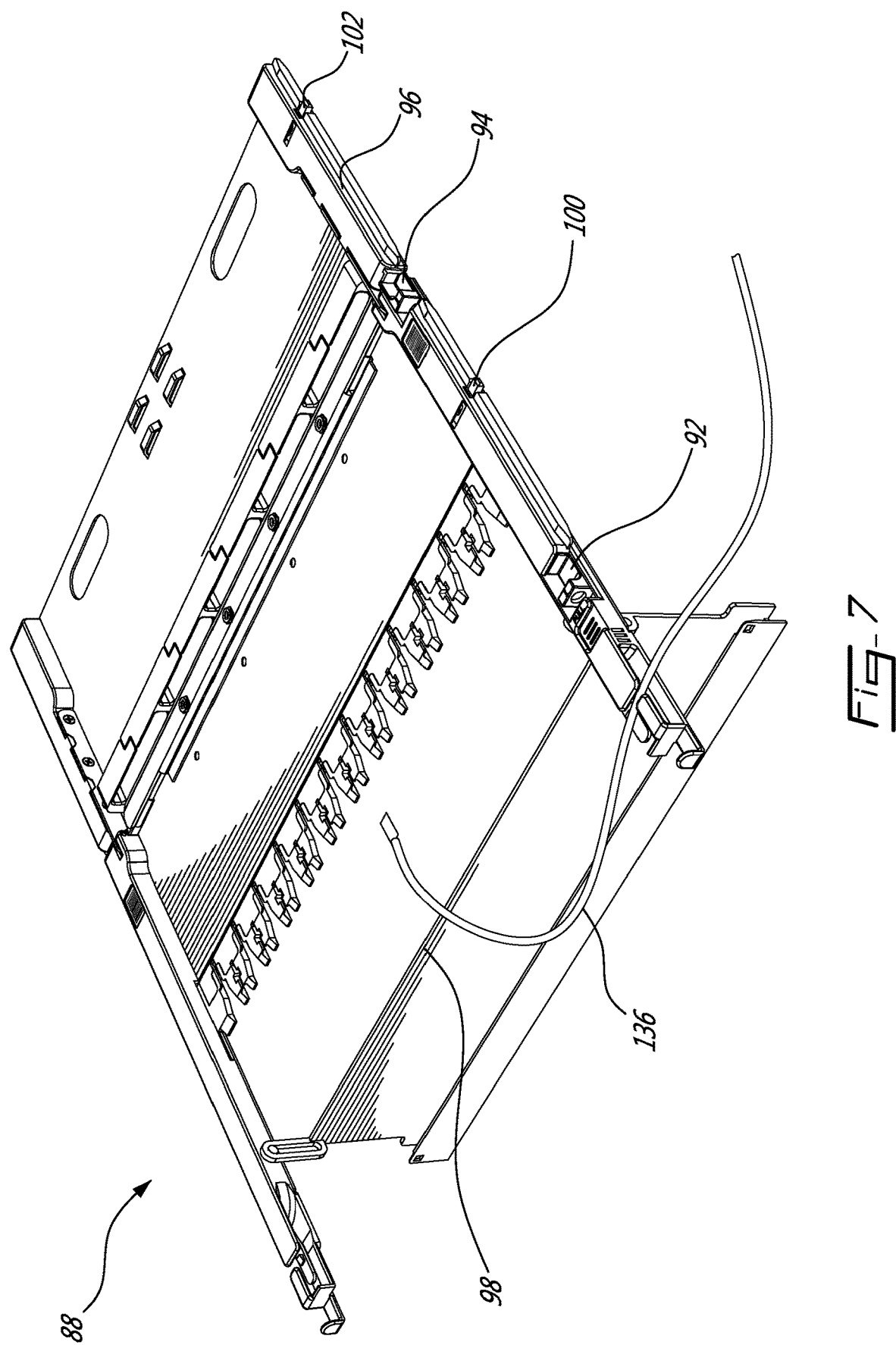

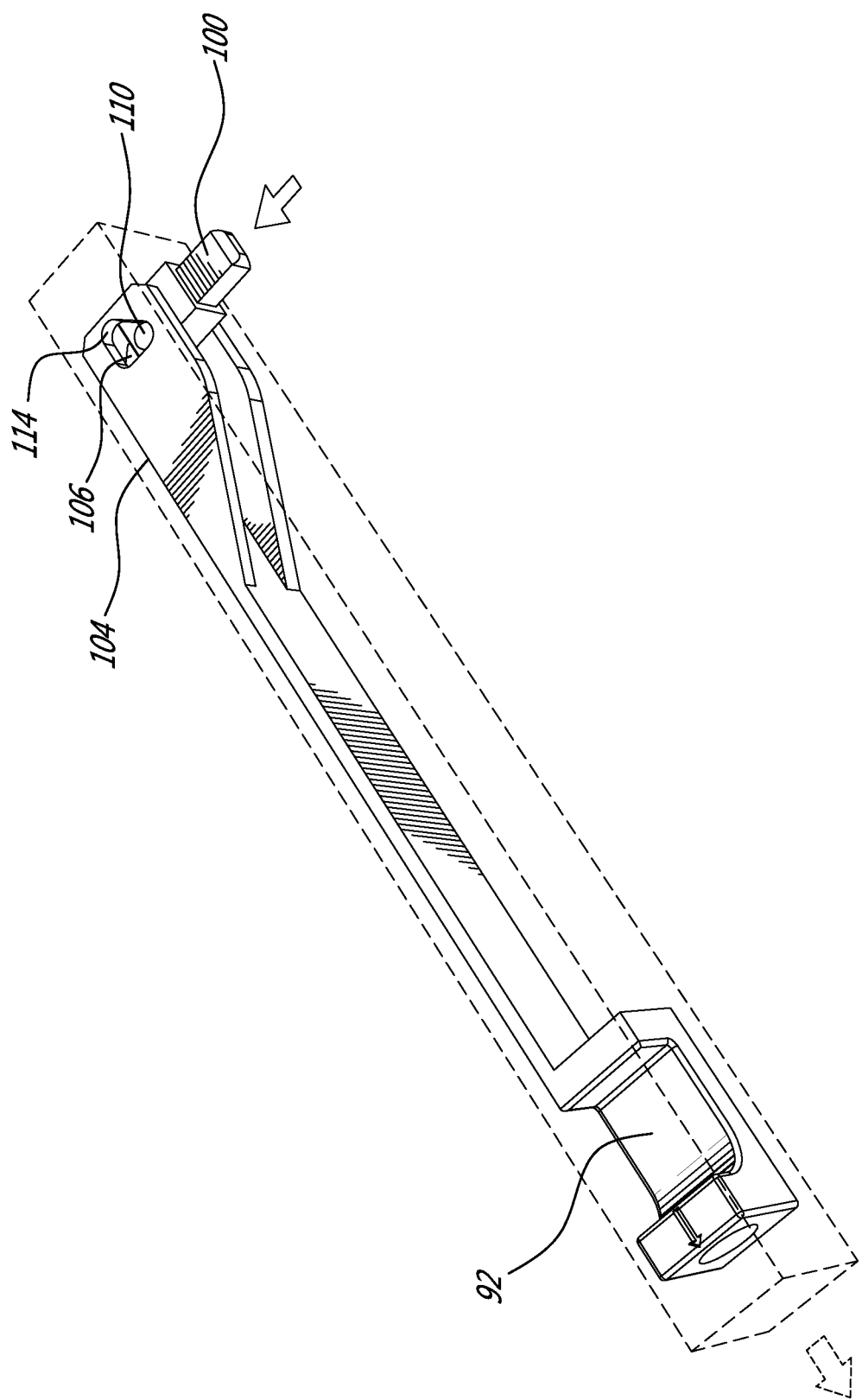

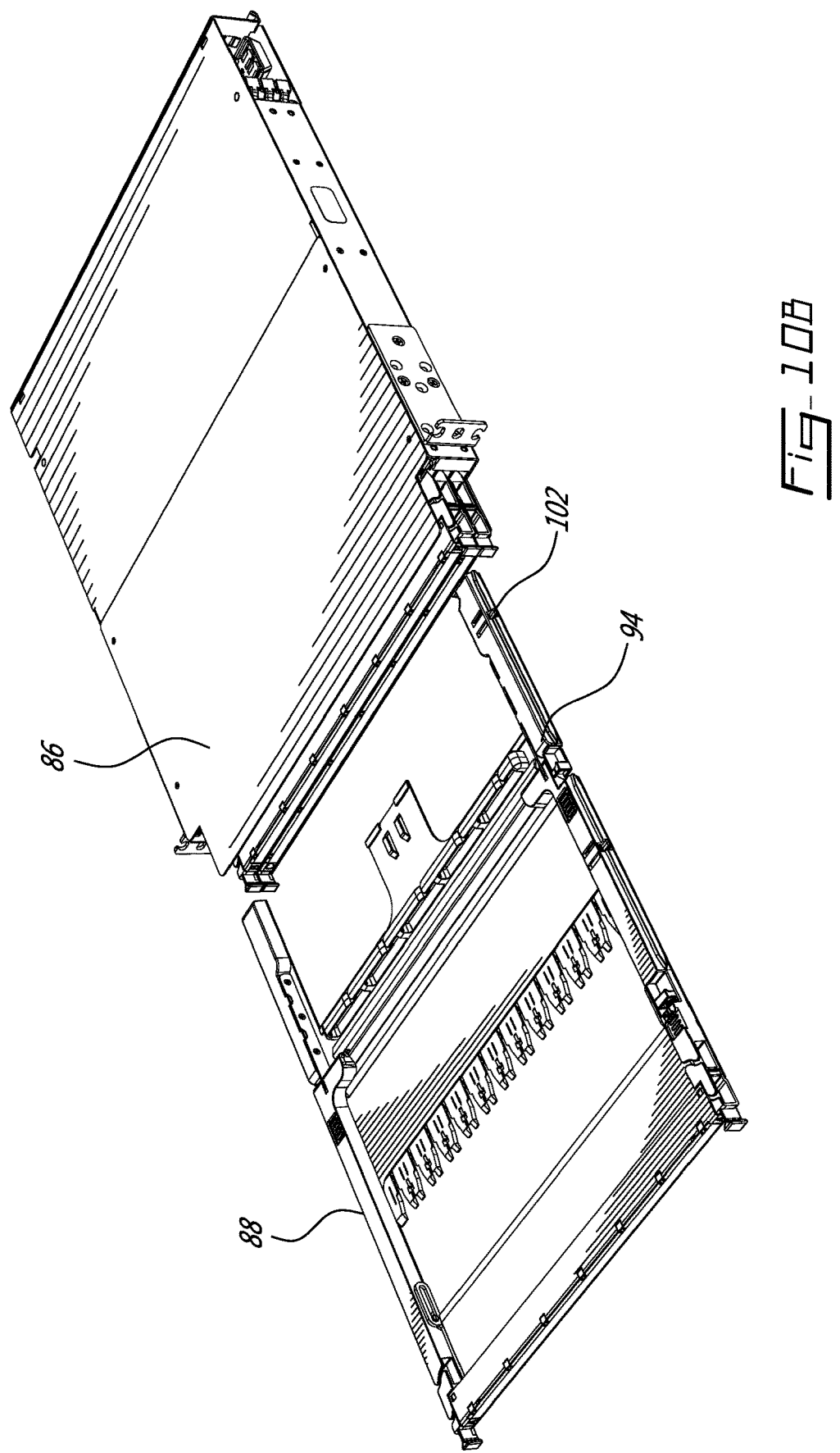

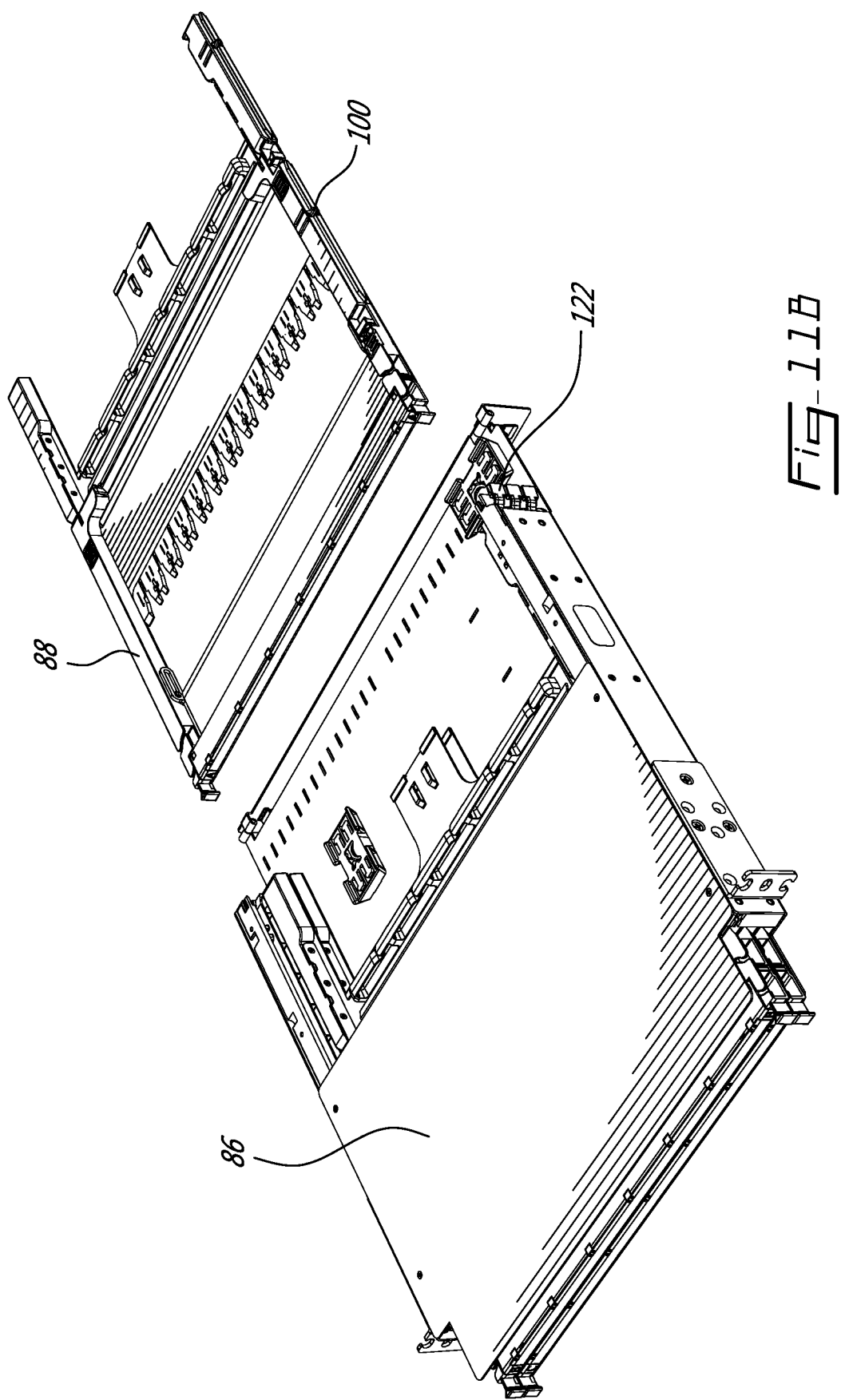

PATCH PANEL SYSTEM WITH TILTABLE TRAY AND MULTIPOSITION LOCK AND RELEASE MECHANISM

CROSS REFERENCE TO RELATED APPLICATIONS

This application claims benefit, under 35 U.S.C. § 119(e) of U.S. provisional application Ser. No. 62/727,736 filed on Sep. 6, 2018 and which is incorporated herein in its entirety by reference.

FIELD OF THE INVENTION

The present invention relates to a patch panel system with tiltable tray and a multiposition lock and release mechanism.

BACKGROUND OF THE INVENTION

Patch panel systems are used to facilitate the connection and routing of various circuits for purposes such as monitoring, interconnecting and testing. Patch panels typically comprise a plurality of ports to connect and manage incoming and outgoing signals, serving a similar purpose as a switchboard, and may be used to interconnect and manage fiber optic cables.

In fiber optic systems patch panels often consist of a plurality of modules arranged side by side which are used to interconnect fiber optic cables. Such patch panels are often implemented as "top of rack" solutions, that is they are arranged above other networking equipment in a rack. One drawback of such solutions is that the modules are difficult to reach for reconfiguration or replacement. Additionally, optic cables connected at the back of the rack are interconnected with optic fibers at the front of the rack and access to the back via the front is often difficult or requires provision of additional cables lengths and the like.

SUMMARY OF THE INVENTION

In order to address the above and other drawbacks there is provided a patch panel cassette system for mounting in a rack. The system comprises a case comprising a top cover, a bottom wall and two opposed side walls, each of the sidewalls attached between respective side edges of the top cover and the bottom wall, the cover and walls together defining a tray receiving space therebetween and a forward edge of each the cover and walls together defining an opening to the tray receiving space, a tray slideably received within the tray receiving space, the tray comprising a front tray section and a rear tray section attached for rotation along a hinge axis by a hinge, the front tray section configured for receiving at least one optic fiber cassette arrangeable side by side along the tray's front end, the tray slideable between a first tray position and a second tray position, and a pair of sliders, each slider slideably securing a respective side of the tray to a respective sidewall of the case, each the slider comprising a elongate fixed rail secured to the respective sidewall and an elongate telescoping rail comprising a front telescoping rail section fixed to the front tray section and a rear telescoping rail section fixed to the rear tray section, the front telescoping rail section and the rear telescoping rail section pivotably linked by a pivot plate. When in the first tray position both the front telescoping rail sections and the rear telescoping rail sections are slideably held at least partially within their respective elongate fixed rails and the front tray section and the rear tray section are in parallel and when in the second tray position the rear telescoping rail sections are slideably held at least partially within their respective elongate fixed rails, the front telescoping rail sections are free of their respective elongate fixed rails and the front tray section is rotatable about the hinge axis between a horizontal position and a lowered position.

There is also disclosed a patch panel cassette system for mounting in a rack. The system comprises a case comprising a top cover, a bottom wall and two opposed side walls, each of the sidewalls attached between respective side edges of the top cover and the bottom wall, the cover and walls together defining a tray receiving space therebetween and a forward edge of each the cover and walls together defining a front opening to the tray receiving space and a rearward edge of each the cover and walls together defining a rear opening to the tray receiving space, a tray slideably received within the tray receiving space, the tray comprising a front tray section configured for receiving at least one optic fiber cassette arrangeable side by side along the tray's front end, the tray slideable between a stored position wherein the tray is positioned within the case, an extended position wherein a front of the tray extends out of the front opening, a patch position between the stored position and the extended position, and a retracted position wherein a rear of the tray extends out of the rear opening, the stored position between the patch position and the retracted position, a pair of sliders, each slider slideably securing a respective side of the tray to a respective sidewall of the case, and a locking mechanism for releasably securing the tray in one of the stored position and the patch position, the locking mechanism comprising a first release accessible from a back of the tray and wherein actuating the first release when the tray is in the stored position allows the tray to be moved into the retracted position and a second release accessible from a front of the tray and wherein actuating the second release when the tray is in the patch position allows the tray to be moved into one of the extended position and the stored position.

Additionally, there is provided a lock for releasably securing a tray slideably mounted to a case comprising two opposed side walls, each side of the tray slideably attached to a respective side wall of the case by a slider comprising an elongate fixed part secured to the slideably and an elongate telescoping part secured to the tray for movement therewith. The lock comprises a release mechanism comprising an elongate actuator slideably held within a channel on a lockable side of the tray for movement between an unactuated position and an actuated position, and a locking assembly positioned on the lockable side and comprising a locking tab moveable at right angles to a direction of travel of the tray, a spring and a cutout in an adjacent one of the elongate fixed part located along a length thereof, the spring biasing the locking tab into the cutout when the locking tab and the cutout are positioned opposite one another. When the elongate actuator comprises a finger receiving indent at a first end thereof for moving the elongate actuator between the unactuated position and the actuated position, wherein the elongate actuator is interconnected with the locking assembly at a second end thereof via a cam and wherein moving the elongate actuator between the unactuated position and the actuated position moves the locking tab via the cam against a bias of the spring, thereby releasing the locking tab from the cutout, the bias subsequently returning the elongate actuator to the actuated position to the unactuated position.

BRIEF DESCRIPTION OF THE DRAWINGS

FIG. 1 provides a right front perspective view of a patch panel system, in accordance with an illustrative embodiment of the present invention;

FIG. 2A provides a right front perspective view of a patch panel system in a closed position, in accordance with an illustrative embodiment of the present invention;

FIG. 2B provides a sectional view along line IIB-IIB in FIG. 2A;

FIG. 3B provides a sectional view along line IIIB-IIIB in FIG. 3A;

FIG. 4B provides a sectional view along line IVB-IVB in FIG. 4A;

FIG. 4C provides a sectional view along line IVC-IVC in FIG. 4A;

FIG. 5 provides a right front perspective view of a patch panel system in a rear access position, in accordance with an illustrative embodiment of the present invention; and FIG. 6 provides a raised right front perspective view of a patch panel in accordance with an alternative embodiment of the present invention;

FIG. 7 provides a detailed raised right perspective view of a tray in accordance with an alternative embodiment of the present invention;

FIG. 8A provides a detailed raised right perspective view of a release mechanism in accordance with an embodiment of the present invention;

FIG. 9D provides a top plan section view of a release mechanism in accordance with an alternative embodiment of the present invention;

FIG. 10B provides a raised right perspective view of a tray removed via the front of the housing and in accordance with an alternative embodiment of the present invention;

FIG. 11B provides a raised right perspective view of a tray removed via the rear of the housing and in accordance with an alternative embodiment of the present invention.

DETAILED DESCRIPTION OF THE ILLUSTRATIVE EMBODIMENTS

Figure 3A:
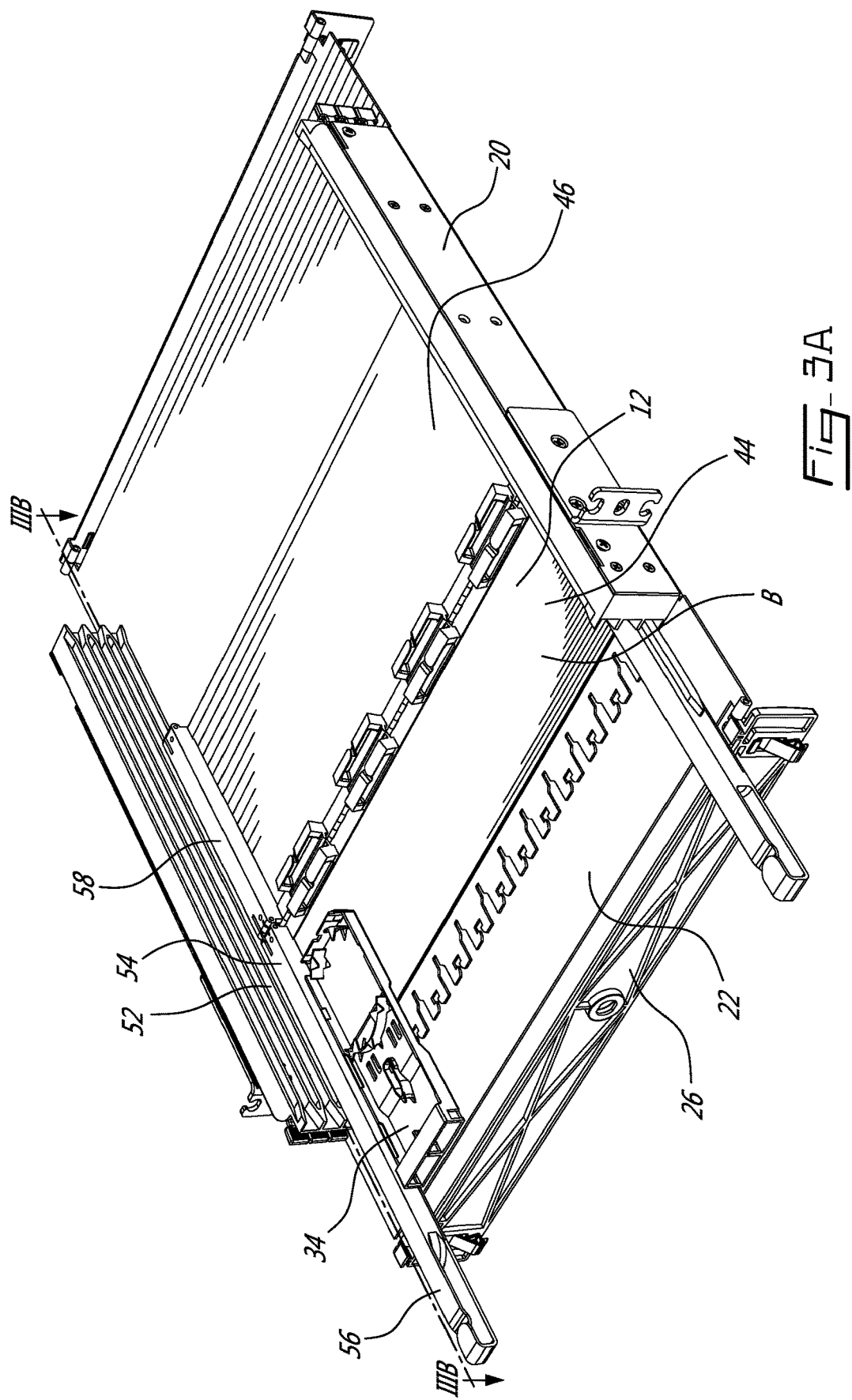
FIG. 3A provides a right front perspective view of a patch panel system in a patch position, in accordance with an illustrative embodiment of the present invention.

Referring now to FIG. 1, a patch panel system, generally referred to using the reference numeral 10, will be described. The system comprises at least one slideable tray 12 illustratively mounted within a case 14. The case comprises a top cover 16, a bottom wall 18 and a pair of opposed sidewalls 20 defining a tray receiving space 22 therebetween. The case 14 is illustratively mountable to the vertical supports of a rack (not shown) via a pair of mounting brackets 24, wherein each of the brackets 24 is attached to an outer surface of a respective one of the sidewalls 20. The case 14 further comprises front and rear access doors 26, 28 that are hinged and rotatable about their respective front and rear edges of the bottom wall 18. As such, the front edges of the top cover 16 and the bottom wall 18 and the front access door 26 define a front opening via which the tray receiving space 22 can be accessed.

Still referring to FIG. 1, the rear edges of the top cover 16 and the bottom wall 18 and the rear access door 28 define a rear opening via which the tray receiving space 22 can be accessed. In an embodiment, top cover 16 is removably attachable to the case 14 via fasteners such as screws or the like (not shown) passing through fastening tabs 30 on the top cover 16. In another embodiment, the front access door 26 and the rear access door 28 each comprise a pair of door latches 32 to lock and unlock the doors 26, 28 to the top cover 16. Illustratively, each tray 12 is slideably positionable between a first or stored tray position A, a second or intermediate tray position B and a third or extended tray position C, and as will be discussed in further detail below.

Still referring to FIG. 1, each tray 12 receives a plurality of removable fiber optic modules or cassettes 34 arranged side by side on an upper surface 36 thereof. In an embodiment, each fiber optic cassette 34 is secured to the tray 12 using a fastener comprising tabs (not shown) of inverted "T" cross section which engage with respective slots 38 machined or otherwise formed in the tray 12. As a person of ordinary skill in the art would understand, each cassette 34 typically comprises a plurality of receptacle modules (not shown) arranged in a row along a forward edge of the cassette 34. Each cassette 34 also terminates a fiber optic cable 40, such as a trunk cable or the like, comprising a plurality of optic fibers at a rearward edge of the cassette 34. Cables 40 exiting the rear of cassettes 34 are directed through cable guides 42 towards the rear of the case 14.

Referring now to FIG. 2A, each tray 12 comprises a front tray section 44 and a rear tray section 46 that are linked by a hinge 48. As such, front tray section 44 is rotatable with respect to the rear tray section 46 along a hinge axis H. For each tray 12, system 10 comprises a pair of sliders 50, each slider 50 securing a respective side of its associated tray 12 to a respective sidewall 20 of the case 14. Each slider 50 comprises an elongate fixed rail 52 attached to a respective sidewall 20 and an elongate telescoping rail 54 illustratively comprising a front rail section 56 and a rear rail section 58. When mutually engaged, the elongate fixed rail 52 and the elongate telescoping rail 54 are arranged in parallel and slideably interconnected, allowing the tray 12 to slide in and out of the tray receiving space 22. The front rail section 54 is fixed to the front tray section 44, and the rear rail section 56 is fixed to the rear tray section 46. The front rail section 54 and the rear rail section 56 are pivotably linked by a pivot plate 60. The pivot plate 60 defines the angles to which the tray 12 may be rotated when outside of the tray receiving space 22, as will be discussed in further detail below.

Referring now to FIG. 2B in addition to FIG. 2A, tray 12 is shown in the first tray position A or a stored position. In this position, the tray 12 is illustratively fully recessed within the tray receiving space 22, and both the front access door 26 and the rear access door 28 may be closed. In this position, both the front telescoping rail section 52 and the rear telescoping rail section 54 are arranged in parallel and engaged by the elongate fixed rail 52. As such, the front tray section 44 and the rear tray section 46 are also arranged in parallel. Front telescoping rail section 52 and rear telescoping rail section 54 each comprise an abutment 62 to allow the tray 12 to be locked in its various positions. Protrusions 64 protruding from the front telescoping rail section 52 trap the abutment 62 in the rear telescoping rail section 54, thus retaining the tray 12 is in the stored tray position A. A sufficient amount of pulling force is required to slide the tray 12 out of stored tray position A. In corresponding sidewall 20 there is locking means 66 comprising a flexible release 68, a pair of angled walls 70 and a recess 72 to retain tray 12 in other tray positions, as will be discussed in further detail below.

Referring now to FIGS. 3A and 3B, tray 12 is shown in the second tray position B or patch position. In this position, the front access door 26 is opened by releasing its door latches 32, and front tray section 44 is partially outside of the tray receiving space 22. A part of the front telescoping rail section 56, the pivot plate 60 and the entirety of the rear telescoping rail section 58 remain inside the tray receiving space 22 and thus engaged with the elongate fixed rail 52. As such, the tray 12 is slideable inward and outward of the tray receiving space 22 while the front telescoping tray section 44 and the rear telescoping tray section 46 remain in parallel. Tray 12 is slideably locked into the patch tray position B when the abutment 62 in the front rail section 56 enters the recess 72 in locking means 66, where it is held by angled walls 70. Release 68 may be flexed to release the abutment 62 from the recess 72 of the locking means 66, thus allowing tray 12 to either be slid back into the tray receiving space 22 towards the first stored tray position A or slid further out of the tray receiving space 22 towards the second patch tray position B.

Figure 4A:
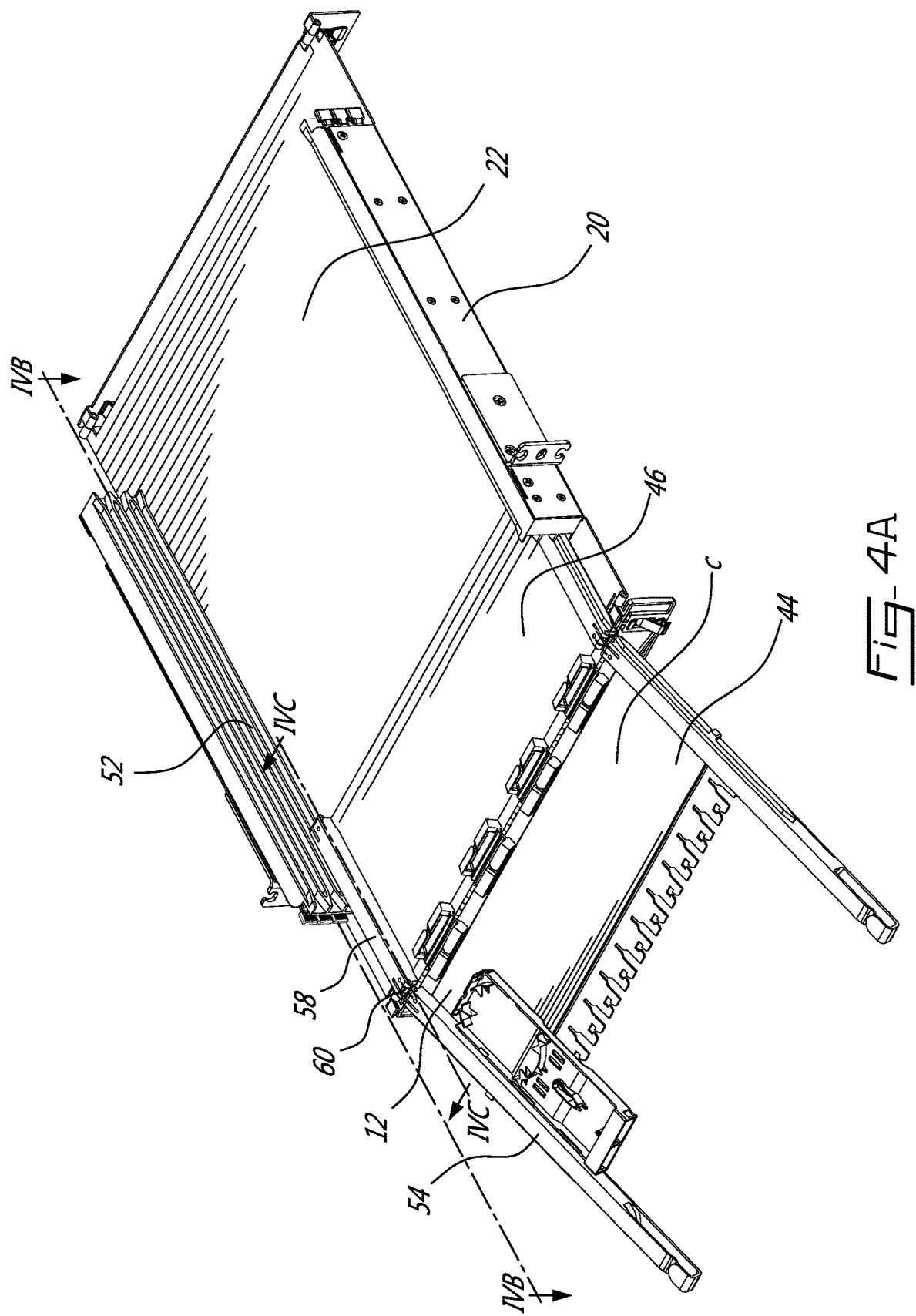
FIG. 4A provides a right front perspective view of a patch panel system in a tilted position, in accordance with an illustrative embodiment of the present invention.

Referring now to FIGS. 4A and 4B, tray 12 is shown in the third tray position C or extended position. In this position, the front access door 26 remains open and the front tray section 44 is fully outside of the tray receiving space 22. As such, the front telescoping rail section 56 and the pivot plate 60 are outside of the tray receiving space 22, while a portion of the rear telescoping rail section 58 remains inside the tray receiving space 22 and thus engaged with the elongate fixed rail 52. In the third extended tray position C, as the front telescoping rail section 56 is outside the tray receiving space 22, it is no longer engaged with the first elongate rail 52. As such, the front tray section 44 is rotatable about hinge axis H via hinge 48 between a horizontal position and a lowered position, thus facilitating access to cassettes 34, especially when tray 12 is towards the top of the case 14.

Referring to FIG. 4C in addition to FIGS. 4A and 4B, the rear tray section 46 remains horizontal as the front tray section 44 rotates about hinge axis H, and the front tray section's 44 rotation is limited by the pivot plate 60. In this regard, the pivot plate 60 comprises a flat kidney shaped plate 74 comprising first a second slots 76, 78 each which engage a respective pin 80, 82 and within which the pins 80, 82 travel. The slots 76, 78 are each illustratively arranged along a path which follows the circumference of a circle 84 who centre coincides with the hinge axis H. As a person of ordinary skill in the art will now understand, as the front tray section 44 is rotated about the hinge axis H relative to the rear tray section 46 the pins 80, 82 travel within their respective slots 76, 78 thereby limiting the maximum angle of rotation. Tray 12 is slideably locked into the third tray position C when the abutment 62 in the rear rail section 58 enters the recess 72 in locking means 66, where it is held by angled walls 70. Release tab 68 may be actuated (flexed) to release the abutment 62 from locking means 66, thus allowing tray 12 to be inserted back into the tray receiving space 22 towards the first tray position A and the second tray position B.

Referring now to FIG. 5, system 12 further allows access to the rear of each tray 12 via rear access door 28. The rear of case 14 is the reverse mirror image of the front of the case 14. As such, a person skilled in the art would understand that the tray 12 is slideable outside of the rear of the tray receiving space 22 to various tray positions in the same fashion as from the front of the tray receiving space 22, as described above. This rear access facilitates installation of the patch panel cassette system 10.

Referring now to FIG. 6, in an alternative embodiment the patch panel cassette system 10 comprises a rack-mountable housing 86 comprising three (3) slideable trays 88 mounted within the housing 86. The housing is illustratively dimensioned to fit into a 19" rack 90 for assembly, for example, with other like housings or network equipment or the like (all not shown).

Referring to FIG. 7, each tray comprises a first actuator 92 and a second actuator 94 positioned along an outer edge 96 thereof adjacent a channel (not shown). The first and second actuators 92, 94 moveable towards a front 98 of the tray 88 in a direction parallel to the direction of tray travel and to actuate a respective on of a pair of locking tabs 100, 102. The locking tabs 100, 102 are biased outwards by a spring and engaged in a stop cut-out (not shown) in the channel and such that the travel of the sliding tray 88 may be limited.

Figure 8B:
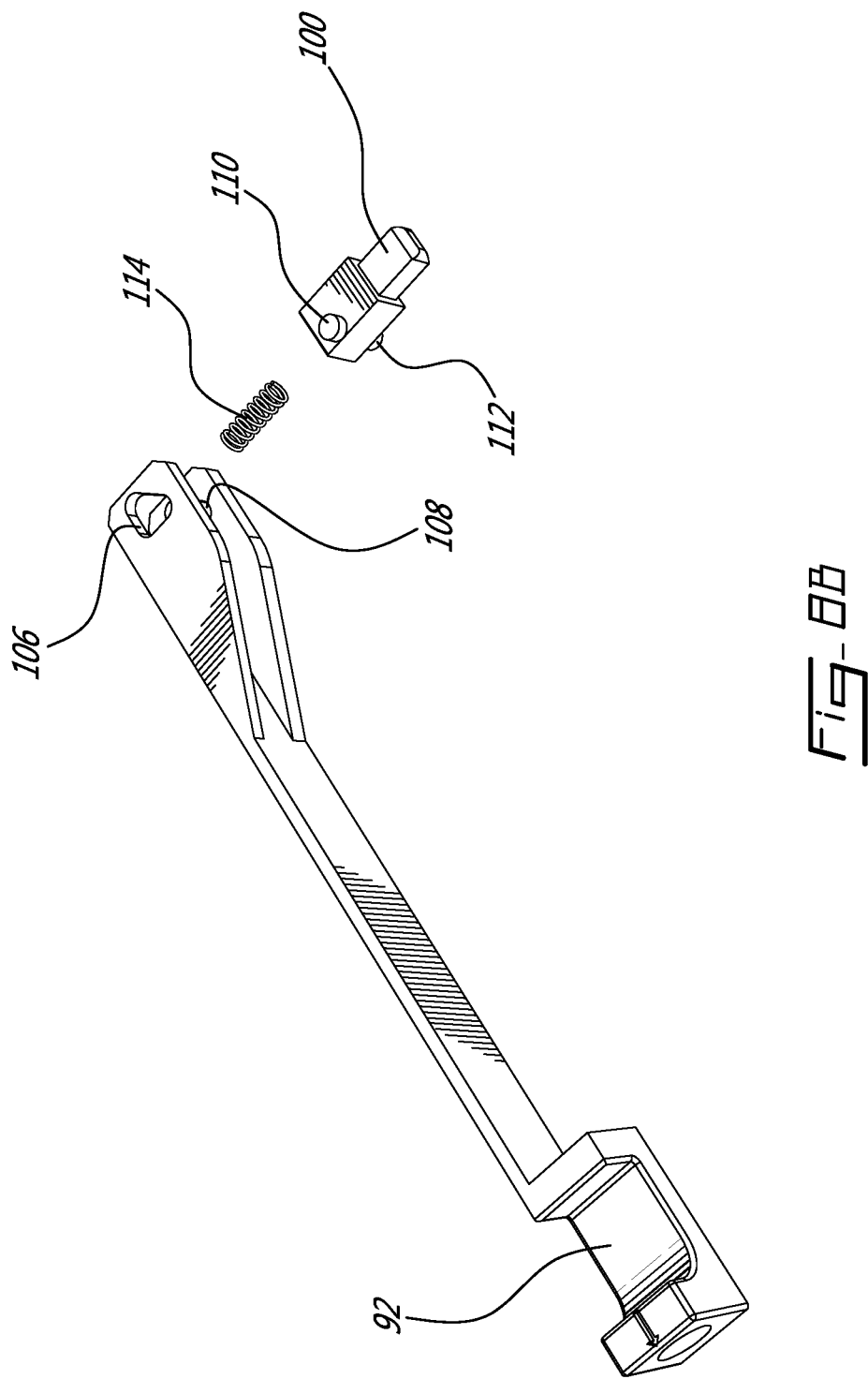
FIG. 8B provides a raised right exploded perspective view of the release mechanism of FIG. 8A.

Referring now to FIGS. 8A and 8B in addition to FIG. 7, each actuator 92, 94 comprises a channel 104 within which a respective one of locking tabs 100, 102 is held. The channel comprises a pair of opposed surfaces comprising cut-outs 106, 108 which engage with respective ones of a pair of bosses 110, 112 extending from opposite sides of the locking tabs 100, 102. A spring 114 is also provided which, as discussed above, biases the locking tabs 100, 102 outwards and such that they can engage a cut-out. The travel of the locking tab is limited to a direction at right angles to the direction of travel of the tray 88, and as such movement of an actuator 92 towards the front 98 of the tray 88 creates a camming action between the angled surfaces of the opposed cut-outs 106, 108 and the pair of bosses 110, 112 and such that the locking tabs 100, 102 are moved laterally against the bias of the spring 114. Upon release of the actuator 92, 94 the spring 114 biases the locking tabs 100, 102 outwards and such that they can re-engage with a first stop (reference 118 in FIG. 9A).

Figure 9A:
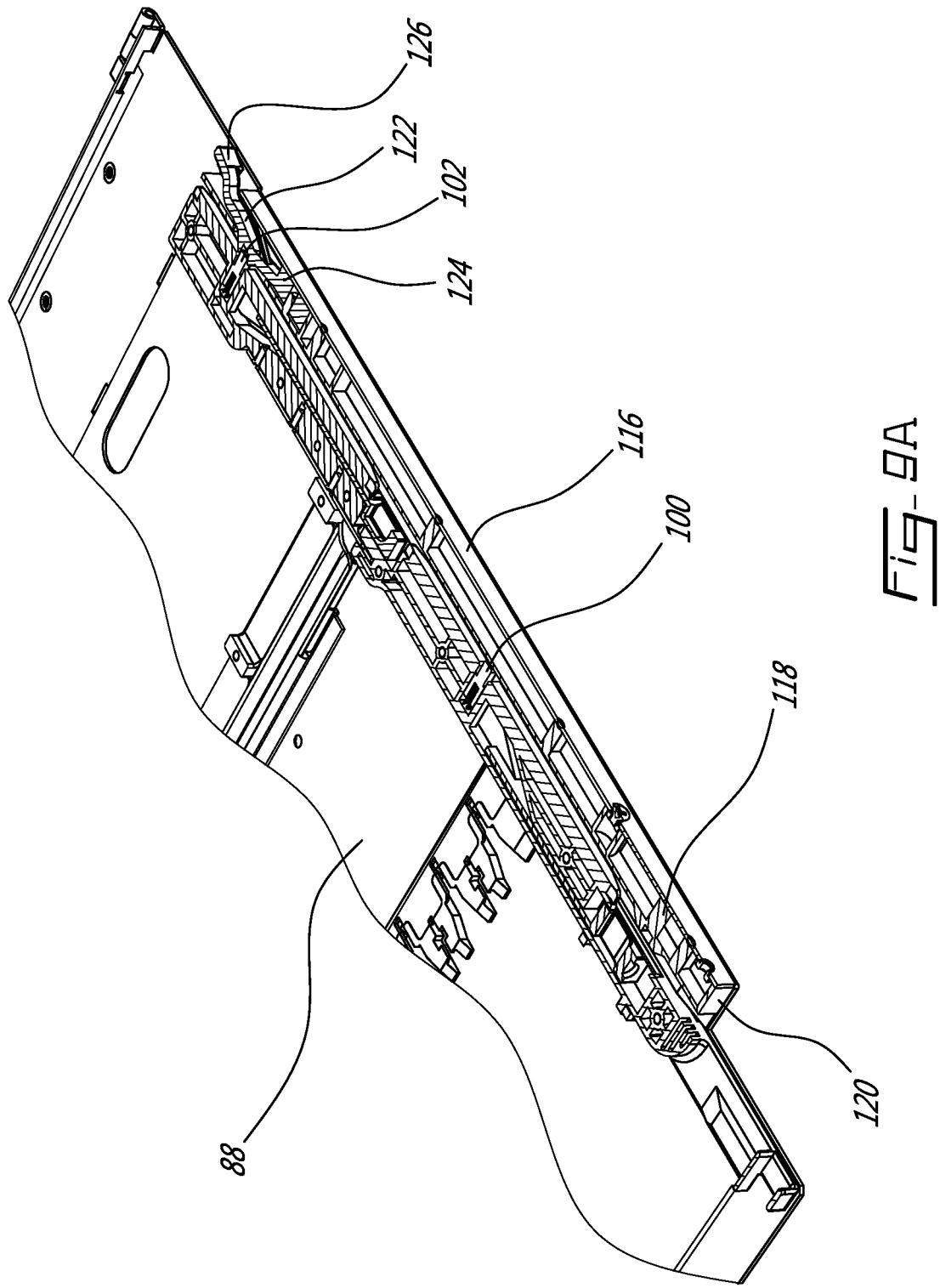
FIG. 9A provides a partial sectional view of a tray and housing in accordance with an alternative embodiment of the present invention.
Figure 9B:
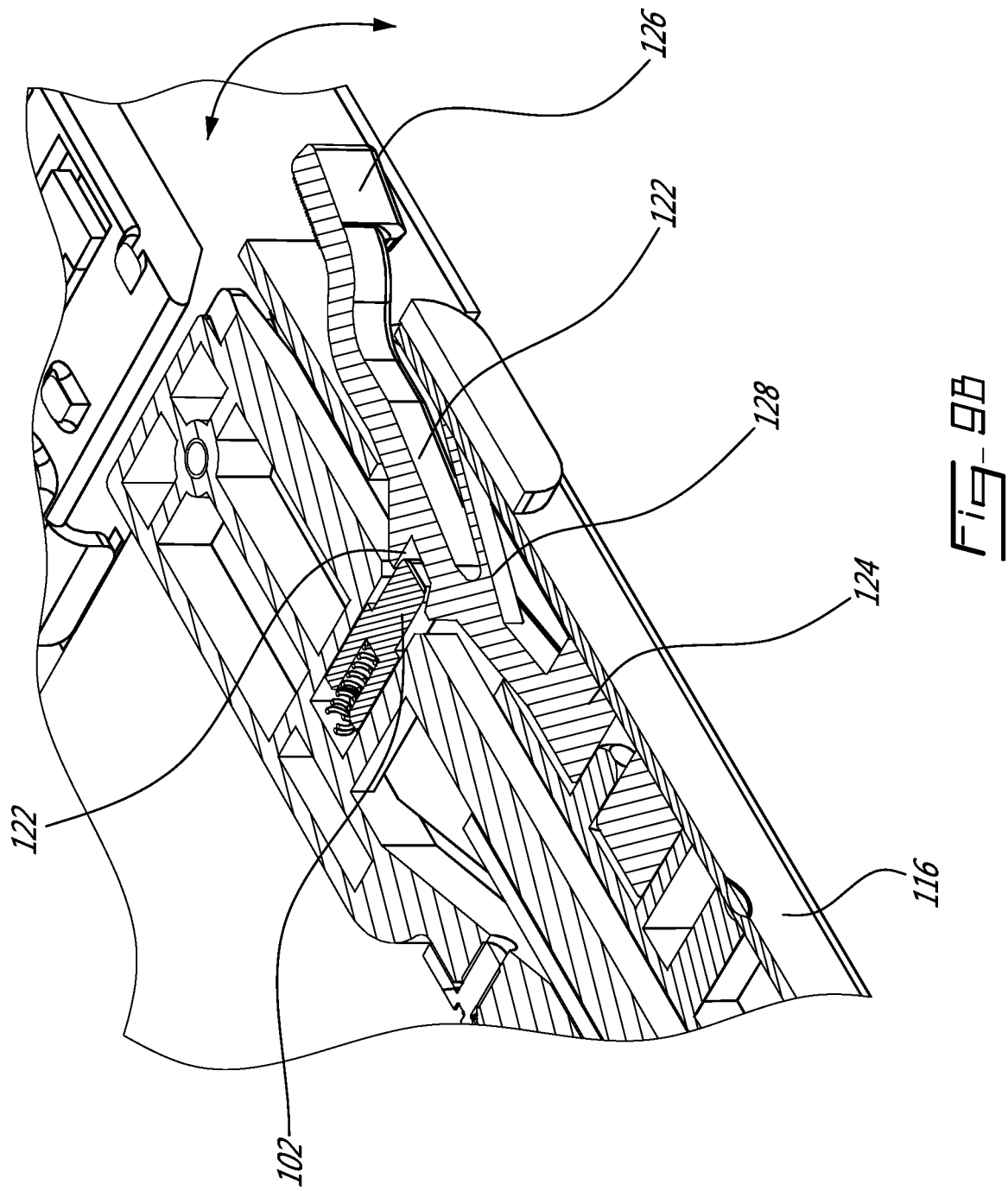
FIG. 9B provides a detailed sectional view of a release mechanism in accordance with an embodiment of the present invention.

Referring now to FIG. 9A, as discussed above, each elongate fixed rail 116 comprises a first stop 118 towards a forward end 120 for engaging one or other of the locking tabs 100, 102 as the tray is slid between a first stored tray position, a second patch tray position and a third extended tray position. With reference to FIG. 9B in addition to FIG. 9A, a second user actuatable stop 122 is provided at the rear of the housing 86. In this regard, the second stop 122 is fabricated from a flexible material with a first end 124 secured to the channel 116 with a second free end comprising a lever 126. Movement of the lever 126 moves the second stop 122 away from the rearward locking tab 102 and against the bias of a flexible foot 128 and such that the locking tab 102 is released from the second stop cut-out 130 and such that the tray 88 can be slid easily backwards into a retracted tray position.

Figure 9C:
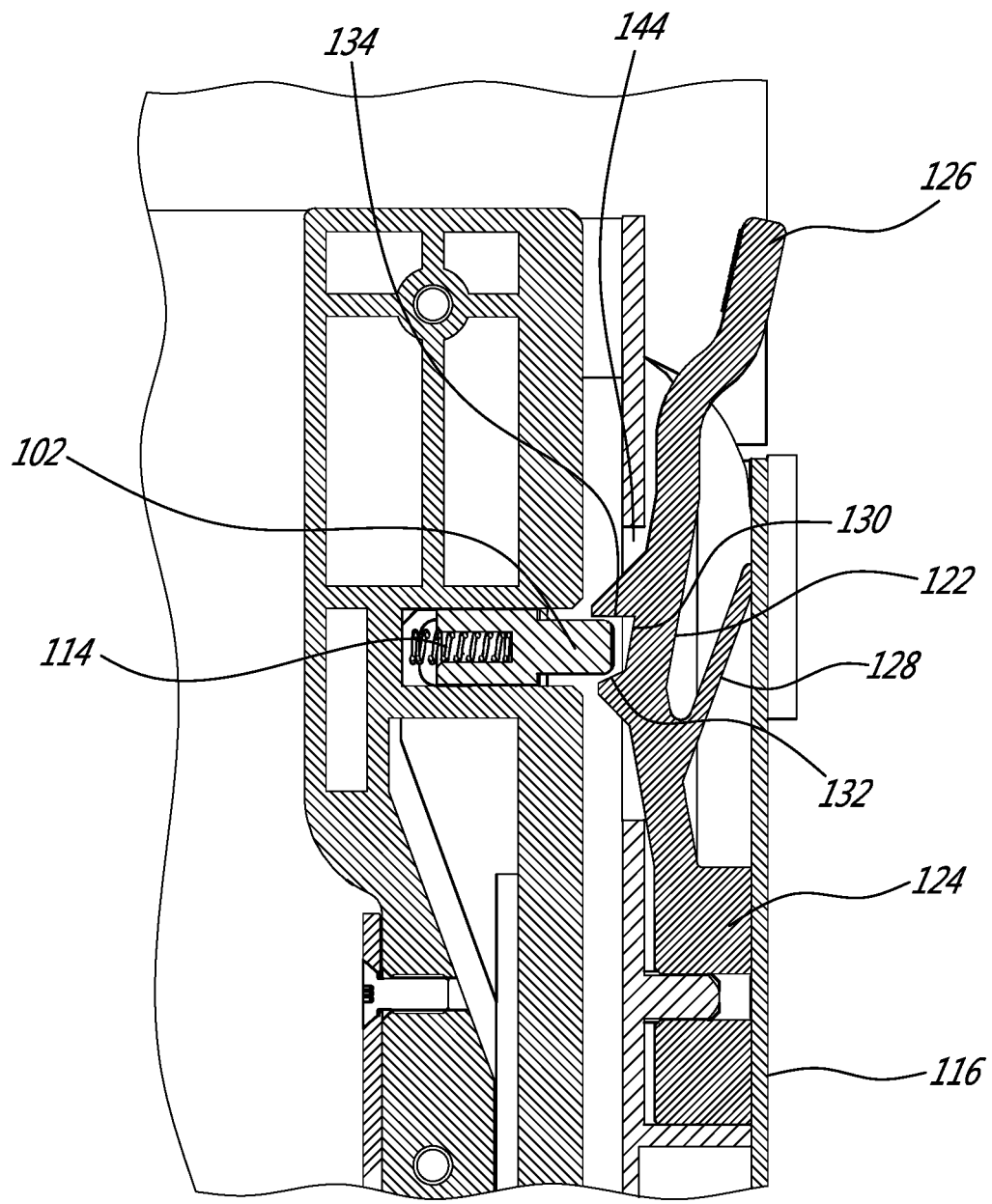
FIG. 9C provides a top plan section view of the release mechanism of FIG. 9B.
Figure 90:
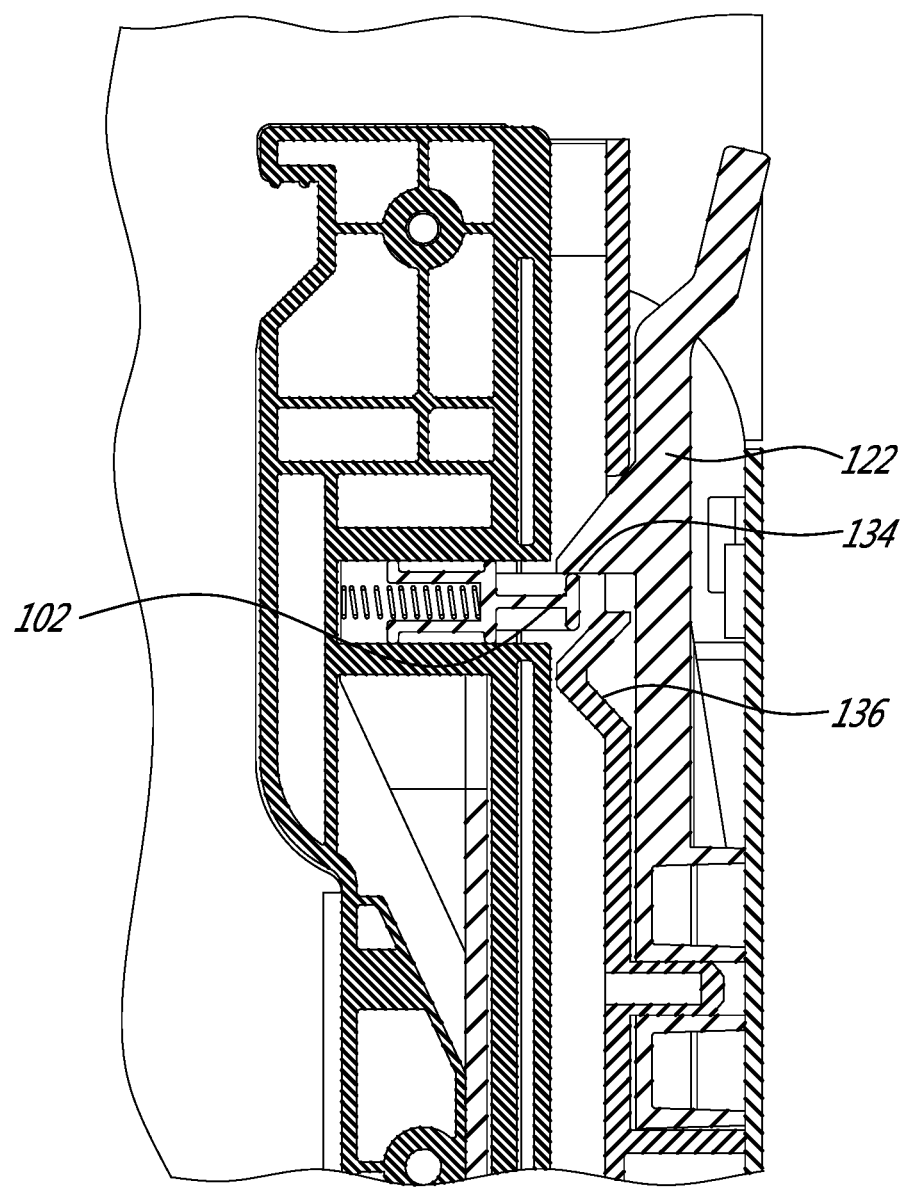

Referring now to FIG. 9C in addition to FIGS. 9A and 9B, the second stop cut-out 130 comprises a forward edge 132 arranged at an acute angle to the direction of travel and a rearward edge 134 arranged at a right angle to the direction of travel. The rearward edge 134 prevents the tray 88 from being moved rearwards unless the rearward locking tab 102 is disengaged from the second stop cut-out 130 using the lever 126 (of note is that in this position the rearward locking tab 102 is typically not actuatable via the second actuator 94 as the tray 88 is within the rack-mountable housing 86 and therefore the second actuator 94 not readily accessible).

Still referring to FIG. 9C in addition to FIGS. 9A and 9B, the forward edge 132 allows the rearward locking tab 102 to be disengaged from the second stop cut-out 130 and move forwards provided enough pulling force is exerted on the tray 88 to move the second stop 122 against the bias of the flexible foot 128. Referring to FIG. 9A, as the tray 88 is slid forward the front locking tab 102 engages with the first stop 118 and such that the tray 88 is locked in a second, or patch, position.

Referring now to FIG. 9D in addition to FIG. 9C, in an alternative embodiment of the second user actuatable stop 122 provided at the rear of the housing 86, the second stop 122 no longer comprises a forward edge 132. Rather, the elongate fixed rail 116 comprises an angled protrusion 136 which engages the locking tabs 100, 102. The rearward edge 134 prevents the tray 88 from being moved rearwards unless the rearward locking tab 102 is disengaged from the second stop cut-out 130 using the lever 126.

In the patch position, and with reference to FIG. 7, fiber optic cables 138 can be inserted into respective receptacles on the one or more fiber optic cassettes (both not shown) installed on the tray 88. By pulling the first actuator 92 forward the forward locking tab 102 can be released from the first stop 118 and such that the tray 88 can be slid into the third, or extended, position, wherein the rearward tab 102 is engaged in the first stop 118.

Figure 10A:
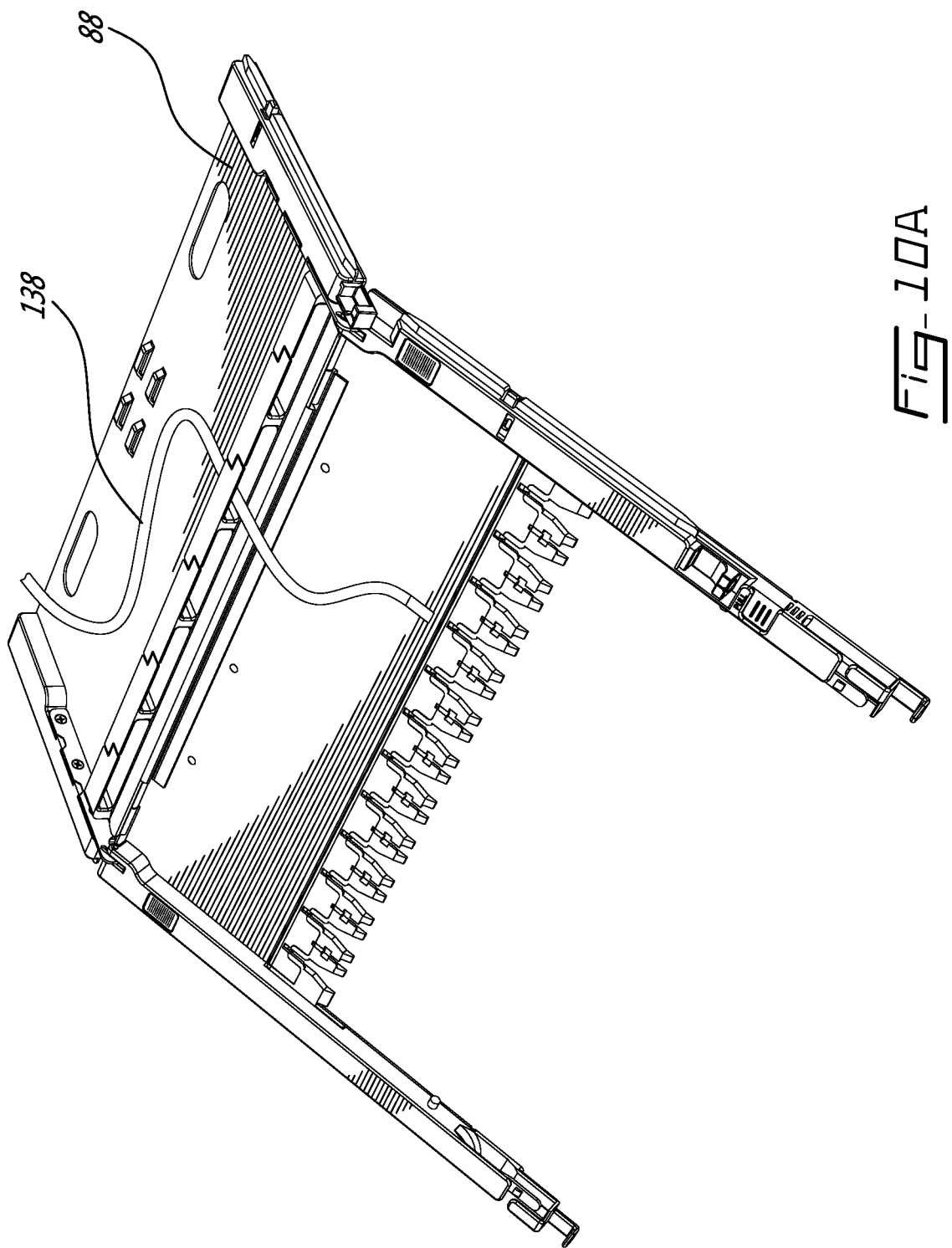
FIG. 10A provides a raised right perspective view of a tilted tray in an extended position and in accordance with an alternative embodiment of the present invention.

In the extended position, and as depicted in FIG. 10A, the front tray section 140 of the tray 88 can be tilted downwards and such that the rearward edge of the optic fiber cassettes (not shown) can be accessed, for example, and the fiber optic cables 138 inserted into respective receptacles (also not shown) on the one or more fiber optic cassettes. The tray can be released from the extended position by actuating (pulling) the second actuator 94 forwards which disengages the rearward tab 102 from the first stop 118 and such that the tray 88 can be moved back into the second patch position and ultimately into the first stored position. Alternatively, and with reference to FIG. 10B, when in the extended position the second actuator 94 can be actuated (pulled) forwards which disengages the rearward tab 102 from the first stop 118 and such that the tray 88 pulled forward such that it can be completely removed from the housing rack-mountable housing 86.

Figure 11A:
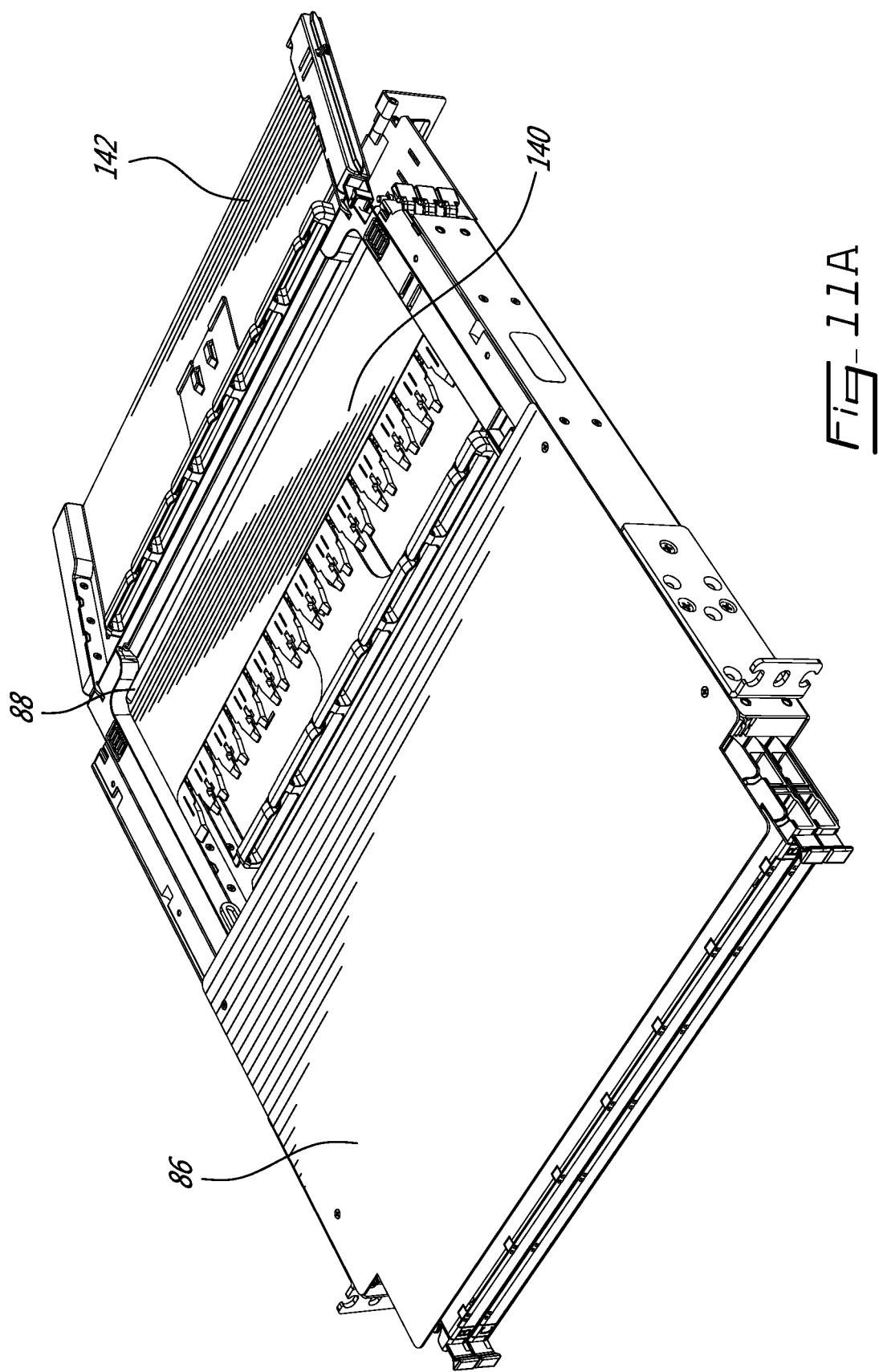
FIG. 11A provides a raised right perspective view of a housing and tilted tray in a retracted position and in accordance with an alternative embodiment of the present invention.

In the retracted position, and as depicted in FIG. 11A, the rear tray section 142 of the tray 88 can be tilted downwards relative to the front tray section 140 and such that the access to the rear tray section 142 is simplified. The tray 88 can be returned to the stored position simply by arranging the rear tray section 142 in parallel to the front tray section 140 and sliding the tray 88 towards the front of the housing 86. With reference to FIG. 9C in addition to FIG. 11A, on meeting the angled rearward surface 144 of the second user actuatable stop 122, the tabs 100, 102 are deflected inwards against the bias of the spring 114.

Alternatively, and with reference to FIG. 11B, when in the retracted position the second user actuatable stop 122 can be actuated (flexed) outwards which disengages the front tab 100 from the first stop 118 and such that the tray 88 may be pulled rearward and such that it can be completely removed from the housing rack-mountable housing 86.

Although the present invention has been described hereinabove by way of specific embodiments thereof, it can be modified, without departing from the spirit and nature of the subject invention as defined in the appended claims.

The invention claimed is:

1. A patch panel cassette system for mounting in a rack, the system comprising:
 a case comprising a top cover, a bottom wall and two opposed side walls, each of said sidewalls attached between respective side edges of said top cover and said bottom wall, said cover and walls together defining a tray receiving space therebetween and a forward edge of each said cover and walls together defining an opening to said tray receiving space;
 a tray slideably received within said tray receiving space, said tray comprising a front tray section and a rear tray section attached for rotation along a hinge axis by a hinge, said front tray section configured for receiving at least one optic fiber cassette arrangeable side by side along said tray's front end, said tray slideable between a first tray position and a second tray position; and
 a pair of sliders, each slider slideably securing a respective side of said tray to a respective sidewall of said case, each said slider comprising a elongate fixed rail secured to said respective sidewall and an elongate telescoping rail comprising a front telescoping rail section fixed to said front tray section and a rear telescoping rail section fixed to said rear tray section, said front telescoping rail section and said rear telescoping rail section pivotably linked by a pivot plate;
 wherein in said first tray position both said front telescoping rail sections and said rear telescoping rail sections are slideably held at least partially within their respective elongate fixed rails and said front tray section and said rear tray section are in parallel; and
 wherein in said second tray position said rear telescoping rail sections are slideably held at least partially within their respective elongate fixed rails, said front telescoping rail sections are free of their respective elongate fixed rails and said front tray section is rotatable about said hinge axis between a horizontal position and a lowered position.

2. The system of claim 1, wherein a maximum angle between said rear tray section and said front tray section is limited by a pivot plate secured at a first end to said front tray section and at a second end to said rear tray section.

3. The system of claim 1, further comprising a pair of mounting brackets, one of said brackets attached to each of said sidewalls on either side of an outside of said case, said mounting brackets for securing said case to the rack.

4. The system of claim 1, wherein said tray is slideable between said second tray position and a third tray position, wherein said second tray position is between said first tray position and said third tray position and wherein in said third tray position said front telescoping rail sections are slideably held at least partially within their respective elongate fixed rails, said rear telescoping rail sections are free of their respective elongate fixed rails and said rear tray section is rotatable about said hinge axis between a horizontal position and a lowered position.

5. The system of claim 1, further comprising a pair of mounting brackets, one of said brackets attached to each of said sidewalls on either side of an outside of said case, said mounting brackets for securing said case to the rack.

6. A patch panel cassette system for mounting in a rack, the system comprising:
- a case comprising a top cover, a bottom wall and two opposed side walls, each of said sidewalls attached between respective side edges of said top cover and said bottom wall, said cover and walls together defining a tray receiving space therebetween and a forward edge of each said cover and walls together defining a front opening to said tray receiving space and a rearward edge of each said cover and walls together defining a rear opening to said tray receiving space;
- a tray slideably received within said tray receiving space, said tray comprising a front tray section configured for receiving at least one optic fiber cassette arrangeable side by side along said tray's front end, said tray slideable between a stored position wherein said tray is positioned within said case, an extended position wherein a front of said tray extends out of said front opening, a patch position between said stored position and said extended position, and a retracted position wherein a rear of said tray extends out of said rear opening, said stored position between said patch position and said retracted position; and
- a pair of sliders, each slider slideably securing a respective side of said tray to a respective sidewall of said case; and
- a locking mechanism for releasably securing said tray in one of said stored position and said patch position, said locking mechanism comprising a first release accessible from a back of said tray and wherein actuating said first release when said tray is in said stored position allows said tray to be moved into said retracted position and a second release accessible from a front of said tray and wherein actuating said second release when said tray is in said patch position allows said tray to be moved into one of said extended position and said stored position.

7. The system of claim 6, wherein said locking mechanism additionally secures said tray in said extended position and wherein actuating said second release when said tray is in said extended position allows said tray to be moved into said patch position.

8. The system of claim 6, wherein said locking mechanism additionally secures said tray in said locked extended position and wherein said locking mechanism comprises a third release accessible from a front of said tray and wherein actuating said third release when said tray is in said extended position allows said tray to be moved into said patch position.

9. The system of claim 6, wherein each of said tray is removable from said case and further wherein each of said trays may be inserted into or removed from the case via both said front opening and said rear opening.

10. The system of claim 6, wherein said tray further comprises a rear tray section attached to said front tray section for rotation along a hinge axis by a hinge, wherein each slider comprises an elongate fixed rail attached to said respective sidewall and an elongate telescoping rail comprising a front telescoping rail section fixed to said front tray section and a rear telescoping rail section fixed to said rear tray section, said front telescoping rail section and said rear telescoping rail section pivotably linked by a pivot plate.

11. The system of claim 10, wherein in said extended tray position said front telescoping rail sections are free from their respective elongate fixed rails and said front tray section is rotatable about said hinge axis between a horizontal position and a lowered position.

12. The system of claim 10, wherein in said retracted tray position said rear telescoping rail sections are free from their respective elongate fixed rails and said rear tray section is rotatable about said hinge axis between a horizontal position and a lowered position.

13. The system of claim 6, wherein between said extended tray position and said retracted tray position, said front tray section and said rear tray section are held in parallel.

14. A lock for releasably securing a tray slideably mounted to a case comprising two opposed side walls, each side of the tray slideably attached to a respective side wall of the case by a slider comprising an elongate fixed part secured to the slideably and an elongate telescoping part secured to the tray for movement therewith, the lock comprising:
- a release mechanism comprising an elongate actuator slideably held within a channel on a lockable side of the tray for movement between an unactuated position and an actuated position; and
- a locking assembly positioned on said lockable side and comprising a locking tab moveable at right angles to a direction of travel of said tray, a spring and a cutout in an adjacent one of the elongate fixed part located along a length thereof, said spring biasing said locking tab into said cutout when said locking tab and said cutout are positioned opposite one another;
- wherein said elongate actuator comprises a finger receiving indent at a first end thereof for moving said elongate actuator between said unactuated position and said actuated position, wherein said elongate actuator is interconnected with said locking assembly at a second end thereof via a cam and wherein moving said elongate actuator between said unactuated position and said actuated position moves said locking tab via said cam against a bias of said spring, thereby releasing said locking tab from said cutout, said bias subsequently returning said elongate actuator to said actuated position to said unactuated position.

15. The lock of claim 14, wherein said elongate actuator comprises an opposed top and bottom, wherein said locking tab is positioned partially between said opposed top and bottom and further wherein said cam comprises a pair of tab mounted bosses extending away from opposite sides of said locking tab and a pair of opposed angled slots each within a respective one of said opposed top and bottom and each of said pair of bosses is engaged in a respective one of said opposed angled slots, said angled slots arranged such that movement of the actuator between said unactuated position and said actuated position imparts a lateral force to said bosses in a direction away from the adjacent elongate fixed part.

* * * * *